(12) United States Patent
Gallagher et al.

(10) Patent No.: US 7,630,823 B2
(45) Date of Patent: Dec. 8, 2009

(54) SYSTEM AND METHOD FOR CONTROLLING THE FUEL INJECTION EVENT IN AN INTERNAL COMBUSTION ENGINE

(75) Inventors: Shawn Michael Gallagher, Erie, PA (US); Roy Primus, Niskayuna, NY (US); Bhaskar Tamma, Karnataka (IN); Jennifer Topinka, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/858,345

(22) Filed: Sep. 20, 2007

(65) Prior Publication Data

US 2009/0078236 A1    Mar. 26, 2009

(51) Int. Cl.
*F02D 41/40* (2006.01)
*F02M 51/00* (2006.01)

(52) U.S. Cl. ...................... 701/105; 123/480
(58) Field of Classification Search ................ 123/435, 123/480, 494, 447, 456, 463, 464, 465; 701/103, 701/104–105; 73/114.33, 114.37
See application file for complete search history.

(56) References Cited

U.S. PATENT DOCUMENTS

| 5,133,645 | A | 7/1992 | Crowley et al. |
| 5,197,438 | A | 3/1993 | Kumano et al. |
| 5,201,294 | A | 4/1993 | Osuka |
| 5,230,613 | A | 7/1993 | Hilsbos et al. |
| 5,261,366 | A | 11/1993 | Regueiro |
| 5,277,156 | A | 1/1994 | Osuka et al. |

(Continued)

FOREIGN PATENT DOCUMENTS

DE    19731643    9/1998

(Continued)

OTHER PUBLICATIONS

Automotive Equipment: Diesel Injection Technology. Common Rail from Bosch for Vehicles Used in the Construction Industry and in Agriculture. http:/www.bosch-presse.de.

(Continued)

*Primary Examiner*—Hai H Huynh
(74) *Attorney, Agent, or Firm*—Robert Wawrzyn, Esq.; Robert L. Wolter, Esq.; Beusse Wolter Sanks Mora & Maire, P.A.

(57) ABSTRACT

A controller, in electrical communication with the one or more of the injectors and a high-pressure fuel pump, generates a first signal responsive to which the valve in the injector opens or closes and a second signal responsive to which the high-pressure fuel pump increases or decreases the pressure level in the fuel accumulator. The system may also include one or more sensors for detecting a temperature of air in an air manifold, a pressure within the air manifold and a barometric pressure. The controller is programmed to estimate an in-cylinder gas density using data received from the sensors. The controller accesses a database having data representative of one or predetermined in-cylinder gas densities that are associated with one or more predetermined fuel injection parameters. The controller then generates one or more commands indicative of the fuel injection parameters that are associated with a predetermined in-cylinder gas density.

19 Claims, 3 Drawing Sheets

U.S. PATENT DOCUMENTS

| | | | |
|---|---|---|---|
| 5,313,924 | A | 5/1994 | Regueiro |
| 5,357,912 | A | 10/1994 | Barnes et al. |
| 5,365,902 | A | 11/1994 | Hsu |
| 5,394,851 | A | 3/1995 | Cryer et al. |
| 5,433,182 | A | 7/1995 | Augustin et al. |
| 5,441,027 | A | 8/1995 | Buchanon et al. |
| 5,492,099 | A | 2/1996 | Maddock |
| 5,605,134 | A | 2/1997 | Martin |
| 5,832,895 | A * | 11/1998 | Takahashi et al. ........... 123/350 |
| 6,016,791 | A | 1/2000 | Thomas et al. |
| 6,067,964 | A | 5/2000 | Ruoff et al. |
| 6,102,009 | A | 8/2000 | Nishiyama |
| 6,158,416 | A | 12/2000 | Chen et al. |
| 6,192,863 | B1 | 2/2001 | Takase |
| 6,286,480 | B1 | 9/2001 | Chen et al. |
| 6,349,702 | B1 | 2/2002 | Nishiyama |
| 6,349,706 | B1 | 2/2002 | Hsu et al. |
| 6,357,421 | B1 | 3/2002 | Pritchard |
| 6,443,123 | B1 * | 9/2002 | Aoki et al. ................... 123/305 |
| 6,557,526 | B1 * | 5/2003 | Hoshino ................ 123/406.26 |
| 6,584,953 | B2 | 7/2003 | Yomogida |
| 6,691,022 | B2 * | 2/2004 | Takemura et al. ........... 701/109 |
| 6,712,045 | B1 | 3/2004 | McCarthy, Jr. |
| 6,728,625 | B2 * | 4/2004 | Strubhar et al. ............. 701/104 |
| 6,748,313 | B2 * | 6/2004 | Li et al. ....................... 701/102 |
| 6,814,050 | B2 * | 11/2004 | Kishibata et al. ............ 123/332 |
| 6,814,060 | B1 * | 11/2004 | Solomons et al. ........... 123/501 |
| 6,848,414 | B2 | 2/2005 | West et al. |
| 7,031,823 | B2 * | 4/2006 | Chatfield et al. ............ 701/104 |
| 7,051,693 | B2 * | 5/2006 | Tetsuno et al. ........... 123/179.5 |
| 7,082,924 | B1 | 8/2006 | Ruedin ....................... 123/352 |
| 7,127,345 | B2 | 10/2006 | Chen et al. |
| 7,162,357 | B2 * | 1/2007 | Chatfield et al. ............ 701/104 |
| 7,234,449 | B2 | 6/2007 | Casabianca et al. |
| 7,337,766 | B2 * | 3/2008 | Nakayama et al. .......... 123/435 |
| 7,387,029 | B2 * | 6/2008 | Cunningham ................ 73/781 |
| 2002/0062819 | A1 | 5/2002 | Takahashi |
| 2004/0024518 | A1 * | 2/2004 | Boley et al. ................. 701/104 |
| 2004/0025849 | A1 | 2/2004 | West et al. |
| 2006/0178800 | A1 | 8/2006 | Chen et al. |
| 2006/0219214 | A1 | 10/2006 | Okude et al. |
| 2006/0225710 | A1 * | 10/2006 | Taglialatela-Scafati et al. ........................ 123/486 |
| 2006/0235604 | A1 * | 10/2006 | Taglialatela-Scafati et al. ........................ 701/109 |
| 2007/0006831 | A1 * | 1/2007 | Leone et al. ............. 123/90.15 |
| 2007/0062476 | A1 * | 3/2007 | Ota et al. ................. 123/179.4 |
| 2007/0073466 | A1 * | 3/2007 | Tamai et al. ................... 701/70 |
| 2007/0209619 | A1 * | 9/2007 | Leone ..................... 123/90.12 |

FOREIGN PATENT DOCUMENTS

| | | |
|---|---|---|
| EP | 0 088 716 | 9/1983 |
| EP | 1 143 140 | 10/2001 |
| EP | 1 348 854 | 10/2003 |
| EP | 1 566 533 | 8/2005 |
| JP | 10274075 | 10/1998 |
| JP | 2004-301080 | * 10/2004 |
| WO | WO 01/86139 | 11/2001 |

OTHER PUBLICATIONS

Grizzle, J.W. et al, "Improved Cylinder Air Charge Estimation for Transient Air Fuel Ratio Control," Jun. 29, 1994, pp. 1568-1573, vol. 2, Baltimore, MD.

* cited by examiner

SYSTEM AND METHOD FOR CONTROLLING THE FUEL INJECTION EVENT IN AN INTERNAL COMBUSTION ENGINE

BACKGROUND OF THE INVENTION

An embodiment of the invention disclosed herein relates generally to internal combustion engines. More specifically, the invention pertains to fuel injection systems and methods that control a fuel injection event in an internal combustion engine.

Improving fuel efficiency while meeting emissions requirements is an ongoing effort in the design of internal combustion engines, including diesel engines. Typically, the reduction of emissions, such as nitrous oxide, is accompanied by increased fuel consumption. For locomotive engines in the United States, emissions compliance must be maintained over a wide range of altitudes and ambient temperatures. Accordingly, a fuel injection strategy that works well at lower altitudes may not be as desirable at high altitudes, because for example, the injection may result in emissions that fail to comply with appropriate regulations.

Traditionally, operating parameters are changed in accordance with ambient conditions such as ambient temperature and pressure, and operating conditions such as intake manifold temperature and manifold pressure, to optimize fuel efficiency. More specifically, parameters such as injection timing, engine speed and engine load have been varied in consideration of these ambient conditions. The hardware design of high-pressure unit pump fuel systems (also referred to as "unit pump systems"), for diesel internal combustion engines, limits the options available for selecting an effective strategy. The injection must occur within a defined window of the top dead center position of the piston. That is the injection must be made when injection pressure is available, which is generally within a fifty degree window around piston top dead center.

In addition, the injection pressure is fixed or predetermined for any given speed of the locomotive engine, and is not variable at a fixed speed and horsepower. In a unit pump system, a controller and solenoid flow control valve controls the flow of fuel from a low-pressure fuel reservoir into a high-pressure fuel pump and a high-pressure line, which is connected to a fuel injector. A needle valve disposed within the injector is mechanically set to open when the pressure of the high-pressure fuel line reaches a predetermined pressure. When the pressure in the high-pressure line drops below a predetermined pressure, the needle closes, thus ending injection.

A subsequent injection is not made until the pressure within the high-pressure line reaches the predetermined pressure level to open the injection valve in the fuel injector. In this type of system, the injection event is dependant directly upon the amount of pressure in the high-pressure line. Therefore, the unit pump system has control only over the timing of the injection, or when the injection is made relative to the top dead center position of the piston. Moreover, the injection pressure is the same for each given notch and cannot be independently varied for different speeds or horsepower of the locomotive. In addition, because pressure between injections must be revived, the current unit pump fuel systems used in locomotive diesel engines are limited to a single injection per injection cycle.

Other fuel systems such as the common rail fuel systems allow for more flexibility in developing fuel injection strategies. The injection event (or opening of the needle valve in the injector) is controlled by an electronic control unit (controller) and solenoid, and is not dependant on in-cycle pressure build up in the high-pressure fuel lines leading to the injector. For a common rail fuel system, the fuel supply pressure to the injector is maintained at a relatively constant, high-pressure level throughout the engine cycle. Such advanced fuel systems allow for fuel injection to take place at any time during the piston cycle and allow for multiple injections during a single cycle. In addition, the supply pressure to the injectors can be changed independent of engine speed and engine load.

Land vehicles, such as locomotives, that travel over significant distances and at varying altitudes, may experience changes to air density in the intake air manifold. Accordingly, some current fuel injection systems, including unit pump systems, consider the manifold air density in determining an injection strategy. More specifically, a locomotive controller contains a database that includes data representative of a maximum volume of fuel to be injected at predetermined engine speeds, and/or engine loads, and a predetermined manifold air pressure. Such a system is disclosed in the commonly owned U.S. Pat. No. 7,127,345.

The locomotive has sensors that detect manifold air pressure, manifold temperature and ambient barometric pressure. Based on measurements taken by these sensors a manifold air density is estimated. If the volume of fuel injected at a given engine speed and at a given manifold air pressure exceeds a predetermined volume limit, the controller adjusts the fuel demand of the locomotive to reduce horsepower. In response to the reduced horsepower, the controller alters the duration of the injection so less fuel is injected during an engine cycle. However, as noted above the unit pump systems are limited in that the injection pressure and the number of injections during an engine cycle are not variable. In addition, the calculation of the air manifold density assumes that the condition of air manifold density is similar to a density of gas within the cylinder which may not be accurate.

BRIEF DESCRIPTION OF THE INVENTION

An embodiment for a high-pressure fuel injection system for controlling the fuel injection event in an internal combustion engine estimates an in-cylinder gas density and selecting a fuel injection strategy based on this estimation. The fuel injection system comprises a high-pressure fuel pump in fluid communication with a low pressure fuel reservoir, a high-pressure fuel accumulator, in fluid communication with the high-pressure fuel pump and one or more injectors that are in fluid communication with the fuel accumulator and each of the fuel injectors is in fluid communication with a corresponding cylinder in which a piston is supported. Each of the injectors has a valve that opens or closes responsive to electrical pulses.

A controller, in electrical communication with the one or more of the injectors and the high-pressure fuel pump, generates a first signal responsive to which the valve in the injector opens or closes and a second signal responsive to which the high-pressure fuel pump increases or decreases the pressure level in the high-pressure fuel accumulator. The system may also include one or more sensors for detecting a temperature of an air manifold, a pressure within the air manifold and a barometric pressure. The sensors generate data indicative of these parameters which data is sent to the controller. The controller is programmed to estimate an in-cylinder gas density using data received from the sensors. The controller is preferably in communication with a database having data representative of one or more predetermined in-cylinder gas densities that are associated with one or more predetermined parameters relating to the injection of fuel into the cylinder during an engine cycle, and responsive to one or more commands generated from the controller.

The term "in-cylinder gas density" as used in this disclosure shall mean the gas density within an engine cylinder when the valves are closed and the piston is at its top dead center position, or, depending on control strategy, when the piston is positioned immediately before fuel injection.

An embodiment of the invention may also be characterized as a method for controlling a fuel injection event in an internal combustion engine. The method comprises steps of detecting, from one or more sensors, a temperature of an air manifold, a pressure within the air manifold and a barometric pressure and generating, from the one or more sensors, one or more signals indicative of the temperature of the air manifold, the pressure within the air manifold and the barometric pressure for sending data relative thereof to a controller. The invention may also comprise the steps of estimating, at the controller, an in-cylinder gas density of a cylinder using the data relative to the temperature of the air manifold, the pressure within the air manifold and the barometric pressure; and, generating, in response to the estimation of the in-cylinder gas density and from the controller, one or more commands relative to fuel injection in the cylinder.

By calculating or estimating an in-cylinder gas density, a fuel system may consider or evaluate data that provides accurate information concerning what is taking place in the cylinder as compared to prior art systems that assumed that manifold air density is an accurate enough measurement to determine a fuel injection strategy. Combining this calculation with the flexibility of the common rail fuel injection timing and multiple injections leads to more efficient fuel consumption.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

Figure 1:
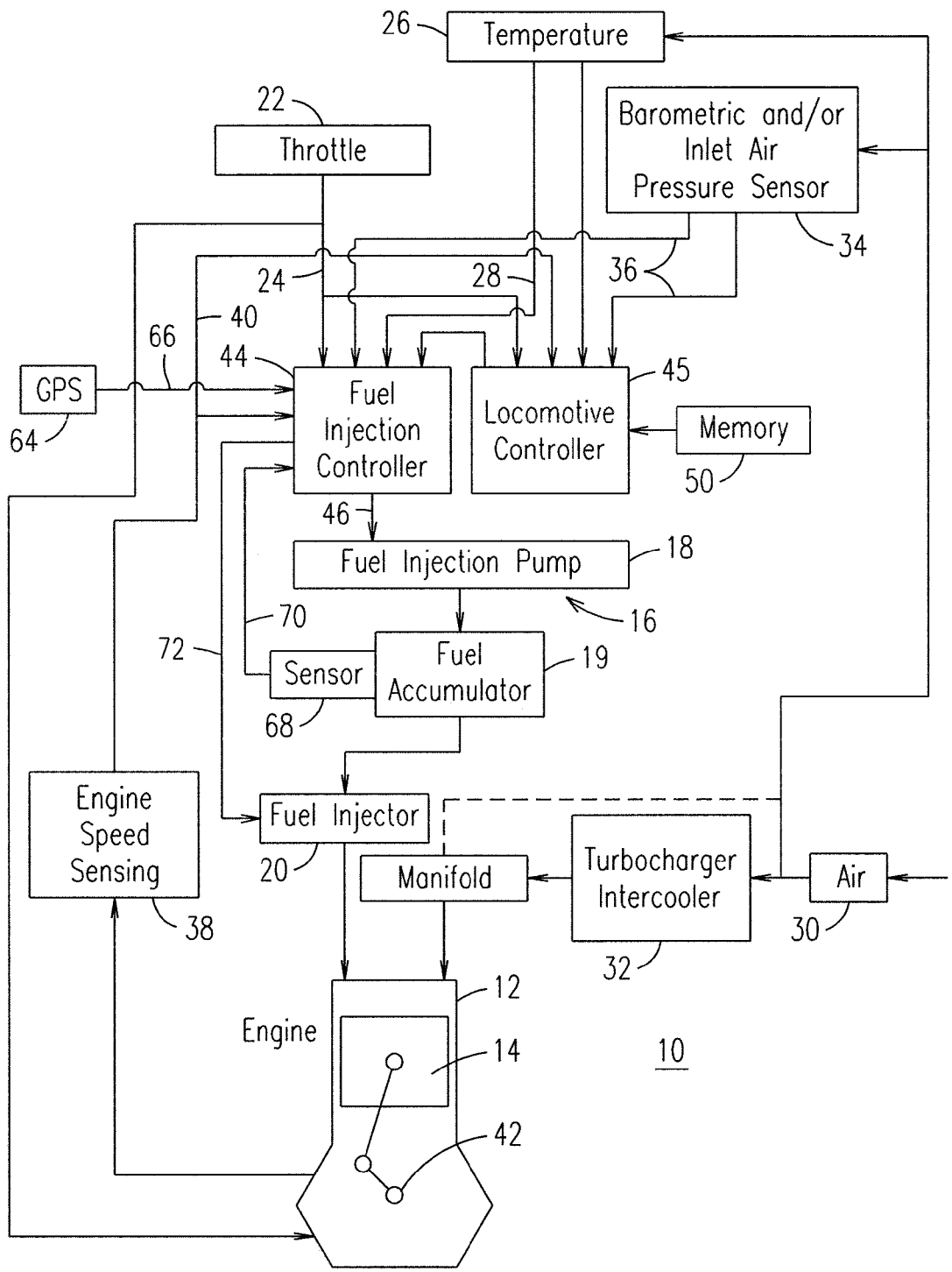
FIG. 1 is a schematic of an embodiment of the invention.

FIG. 1 is a schematic illustration of a diesel engine 10 using diesel or alternate liquid fuels and incorporating a fuel injection control scheme providing enhanced engine performance in varying environmental conditions. Engine 10 is representative of any large, medium-speed, multi-cylinder diesel engine such as may be used in locomotive, marine or power generation applications. Engine 10 includes a plurality of power cylinders 12 (one illustrated) each having a piston 14 reciprocating therein. A fuel injection apparatus 16 injects fuel into the respective cylinders 12 in timed sequence with the reciprocation of the pistons 14. The fuel injection apparatus 16 may be of the common rail fuel system type, or other advanced high-pressure fuel system, and includes a fuel pump 18, a fuel accumulator 19 that stores fuel under pressure and a fuel injector 20 associated with each cylinder 12. While the components 18, 19 and 20 are illustrated as separate parts these components may be integrated as a single component Each fuel injector 20 preferably includes a valve that opens or closes responsive to commands 72 from a fuel injection controller 44. A pressure sensor 68 detects the fuel pressure within the accumulator 19 and generate signal 70 which is sent to the fuel injection controller 44. The fuel injection controller (44) controls a metering valve in the fuel system based on the pressure in the accumulator 19. The fuel injection controller 44 also controls a solenoid inside the injector to control, start and stop fuel injections.

The engine 10 also includes an engine power and/or throttle position selection and sensing apparatus, collectively referred to herein as throttle 22. The throttle 22 provides a power demand signal 24 that is responsive to an operator throttle input. For locomotive engines, the throttle input will typically include a plurality of discrete throttle settings that are commonly referred to as notches, such as N1 thru N8, plus an idle setting. A temperature sensor 26 provides a temperature signal 28 responsive to a temperature of the air 30 being delivered to the engine 10 to support combustion. The temperature sensor 26 may be configured to measure the temperature of ambient air or inlet air entering the turbo-compressor, or preferably as indicated by the dashed line in FIG. 1, it may measure manifold air temperature downstream of a turbocharger/intercooler system 32. Alternatively, the temperature sensor may be configured to measure both ambient/inlet air temperature and manifold air temperature. One or more pressure sensors 34 provide one or more pressure signals 36 responsive to a detected ambient atmospheric pressure and a detected manifold air pressure. An engine speed sensor 38 provides an engine speed signal 40 responsive to the engine operating speed that corresponds to the rotating speed of the engine crankshaft 42, for example.

In an embodiment in which the engine 10 is used in a vehicle encountering varying environmental conditions such as changes in altitudes, the vehicle is equipped with a global positioning system 64 transmits a positioning signal 66. Such a signal preferably includes data relative to an altitude of the vehicle.

The fuel injection controller 44 controls the fuel injection system 16 and components thereof. As described in more detail below, the fuel injection controller 44 generates one or more command signals 46 that control a fuel injection event of the engine 10. A locomotive controller 45 is provided for controlling an engine speed and engine load using an imbedded software program to maintain the power demand requested by the throttle position 22 and to achieve a desired output performance. The fuel injection controller 44 and locomotive controller 45 may be any style of controller known in the art, and are typically a computer or microprocessor configured to execute programmed instructions stored on a computer readable medium, for example memory 50 which may be a hard or floppy magnetic disk, a laser readable disk, a memory stick, etc.

The fuel injection controller 44 receives the power demand signal 24 (relative to engine speed and load) the temperature signal or signals 28, the pressure signal or signals 36 and the engine speed signal 40 as inputs, among other signals. Signals 24 relative to engine load may be received directly from the throttle system 22 or the locomotive controller 45. Responsive to the signals relative to manifold temperature, manifold pressure, and the ambient air pressure, and upon executing programmed logic, the fuel injection controller 44 estimates an "in-cylinder gas density" then provides a control signal 46 representative of a fuel injection strategy to the fuel injection system 16. The fuel injection controller 44 generates data relative to parameters of the fuel injection event such as the timing (advance angle AA) of the injection, the number of injections made during an engine cycle, the duration of each injection, time interval between injections, and/or the pressure of fuel in the accumulator. In order to optimize the injection strategy for the current operating condition, the fuel injection controller 44 may also adjust other engine performance parameters, such as, engine speed or horsepower. The fuel injection controller 44 then sends commands to the fuel injection pump 18 and the fuel injector 20 to execute the injection strategy. The advance angle is the position of the crankshaft 42 at which the fuel injection is initiated for a given cylinder 12 expressed in degrees of rotation before a top-dead-center position of the respective piston 14. Another embodiment of the control logic is to reassess the injection control signals 46 and make adjustments based on the "in-cylinder gas density" at the selected start of injection rather than that estimated for the piston at the top dead center position.

The controller 44 is programmable to estimate the in-cylinder gas density using the following Ideal Gas Law equation:

$$\rho_{ref} = \left[\frac{P_{ref}}{R * T_{ref}^{10}}\right]$$

where $\rho_{ref}$ represents the reference density. R represents a gas constant of the operating fluid, which is generally air, but could reflect other gas compositions, such as air and recirculated exhaust gas. $P_{ref}$ represents absolute reference pressure, which is determined by adding the barometric pressure and the manifold air pressure, if the manifold air pressure sensor is a gage sensor. $T_{ref}$ represents the reference temperature or the manifold temperature in absolute temperature units.

Then the in-cylinder gas density used for the control logic is calculated from:

$$\rho_{in\text{-}cylinder} = \rho_{ref} * \frac{V_{ref}}{V} * \eta_{vol}$$

where $\rho_{in\text{-}cylinder}$ represents the in-cylinder gas density used for the selection of the injection control strategy. $V_{ref}$ represents the reference cylinder volume consistent with the above reference conditions which would be the cylinder 12 volume at the point of intake valve closing. V represents the volume selected for estimating the in-cylinder gas density. The volume of the cylinder 12 at its top dead center position may be selected for one embodiment of the invention, or, in another embodiment of the control, the V may represent the volume of the cylinder at the selected time of fuel injection or other selected crank position reference points. The symbol $\eta_{vol}$ represents an empirical coefficient to account for the volumetric efficiency of the cylinder. The value of $\eta_{vol}$ may be set to a fixed value or changed with engine operation as determined from experimental data for controller calibration. Typical values of $\eta_{vol}$ range from 0.88 to 0.99.

By combining the two equations above, referencing the density at bottom dead center ($V=V_{ref}$), and multiplying by the volume displacement rate of a four-stroke engine ($D*N/2$), the mass flow of air into the cylinder can be estimated by:

$$\dot{m}_{in} = \left[\frac{\eta_{vol} * D * N * P_{ref}}{2 * R * T_{ref}}\right]$$

The $\dot{m}_{in}$ represents the estimated flow rate of air into the cylinder. The D is a constant that represents the volumetric displacement of air by a piston measured from a bottom dead center position in the cylinder to a top dead center position. The N represents the engine rotational speed. The $P_{ref}$ is the absolute manifold pressure. In the denominator of this equation, the R represents a gas constant for the operating fluid, which is generally air but could reflect other gas compositions, such as air and recirculated exhaust gas; and the $T_{ref}$ is the manifold temperature in absolute units.

For a predetermined in-cylinder gas density and/or altitude the fuel injection controller 44 generates a control signal 46 indicative of a fuel injection strategy associated with the in-cylinder density and/or altitude. Programmed logic for accomplishing such a control scheme may be implemented with an embedded software program by storing a series of look-up tables in memory 50 accessible by the controller 44. Control values for fuel injection timing, the number of fuel injections in an engine cycles, the duration of each injections, time interval between injections, and the fuel accumulator pressure are stored in respective look-up tables for a plurality of in-cylinder densities or altitudes and/or combinations of in-cylinder gas densities and altitudes. Distinct control values or parameters of a fuel injection strategy may be provided for distinct in-cylinder gas density or altitude levels. These control values may be calculated to produce optimal engine performance using known numeric models of the combustion process and/or developed algorithms for the outputs as functions of those input variables, or they may be derived from empirical data.

Figure 2:
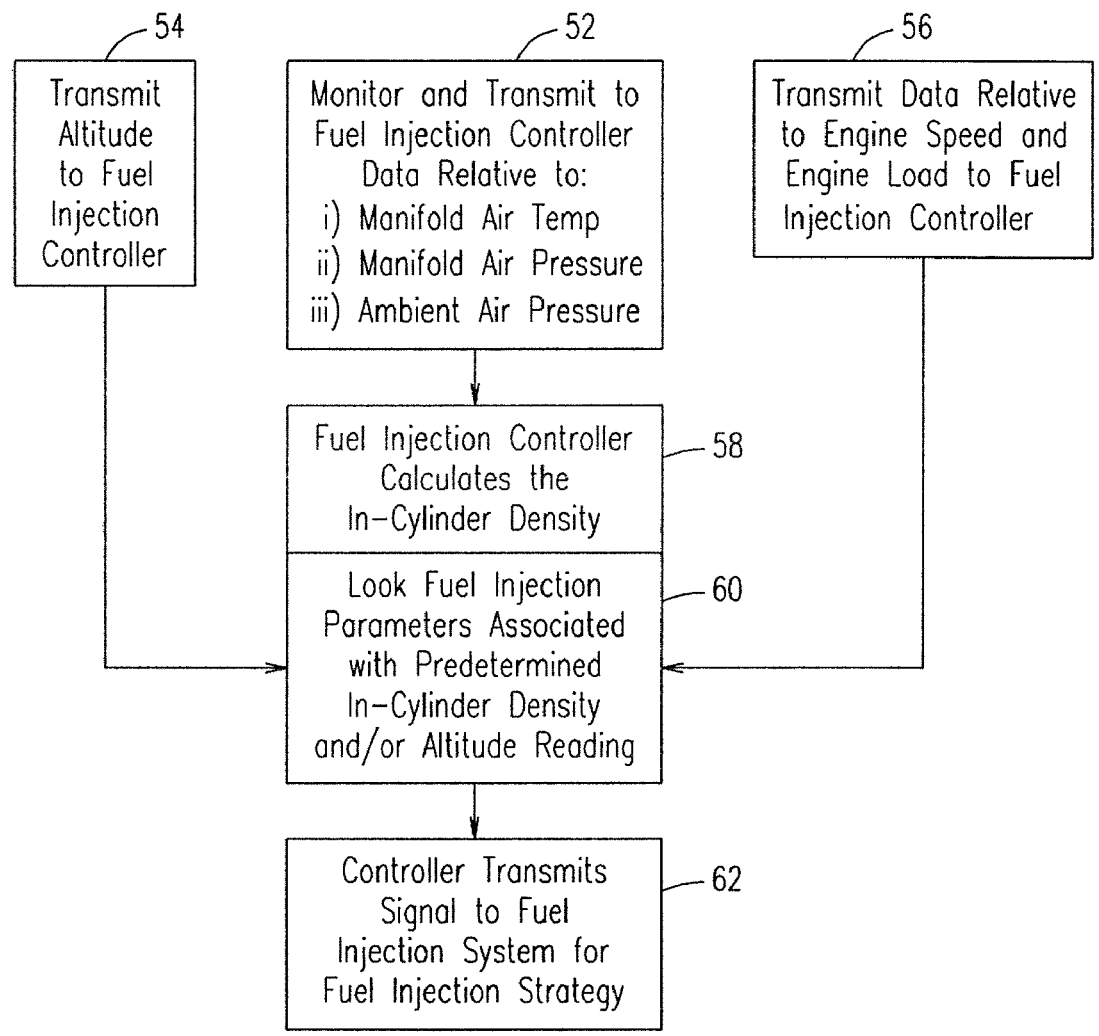
FIG. 2 is a flow diagram representing steps followed in an embodiment of the invention.

In one embodiment, such as an application with discrete speed/power settings such as a locomotive, the present invention includes programmed logic implementing a method of controlling engine 10 as represented in the flow chart in FIG. 2. At step 52 the method includes monitoring the manifold temperature, manifold pressure and the pressure of the ambient air 30 and transmitting a temperature signal 28 and a pressure signal 36 to fuel injection controller 44. In addition, at step 54 data relative to the altitude or geographic location at which the engine 10 is operating is sent to the fuel injection controller 44 via control signal 66 from a global positioning system 64. In step 56, which may occur simultaneously with step 52 and/or step 54, data indicative of engine speed and load is generated and sent to the controller 44, which data may be sent via control signals 40 and 24 respectively.

As to step 58, the fuel injection controller 44 then calculates the in-cylinder gas density using the data relative to the air manifold temperature and pressure and the ambient air pressure. As mentioned above, and in reference to step 60 the fuel injection controller 44 has access to a memory 50 and/or database that includes one or more predetermined in-cylinder gas densities and/or altitudes that are associated with one or more control values or parameters relating to a fuel injection strategy. Such parameters may include fuel injection timing, the number of injections per engine cycle, the duration of each fuel injection, time interval between injections, and the fuel accumulator pressure. The data relating to the calculated in-cylinder gas density and detected altitude are compared to the predetermined values of these parameters stored in the memory 50. For those predetermined in-cylinder gas density values and/or altitudes that match or ranges within which the calculated in-cylinder gas densities and/or detected altitudes fall within, the controller selects the one or more associated fuel injection control values or parameters. In addition, as the fuel controller 44 has received data relative to the operating engine load and engine speed, these parameters may be adjusted as necessary to achieve the desired fuel consumption and emissions. Accordingly, in step 62 the fuel injection controller 44 transmits a signal 46 to the fuel injection system 16, which signal 46 is indicative of the selected fuel injection strategy including the fuel injection control values. In contrast to prior art fuel injection systems for locomotives; the fuel accumulator pressure in the present system and injection strategy can be adjusted independent of other fuel injection parameters.

In an embodiment, the fuel injection strategy may be varied for altitudes above a predetermined height, such as above 7,000 feet above sea level, for example. One or more restrictive operational limitations, such as an exhaust emission limit or fuel efficiency, may be relaxed above a predetermined altitude. By relaxing a limiting design restriction in only such extreme environmental conditions, the benefit of maximizing engine power output while staying within mechanical and thermal loading limits may be found to be beneficial. In the example of relaxed fuel efficiency at high altitude, the locomotive operator may find it beneficial to use maximum horsepower to increase train speed. Another example may be that when the locomotive is determined to be in a tunnel, by GPS or onboard sensor readings indicative of entering a tunnel, an injection strategy can be used that maximizes power to minimize power duration in the tunnel.

Figure 3:
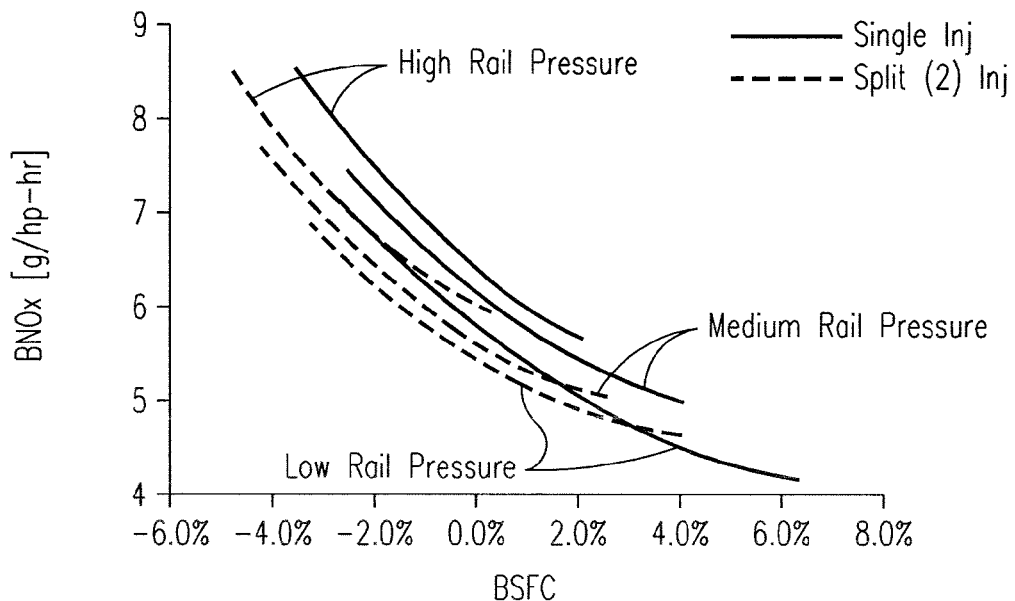
FIG. 3 is a graph having nitrous oxide ($NO_x$) emissions plotted versus fuel consumption for injections made at different injection pressures.
Figure 4:
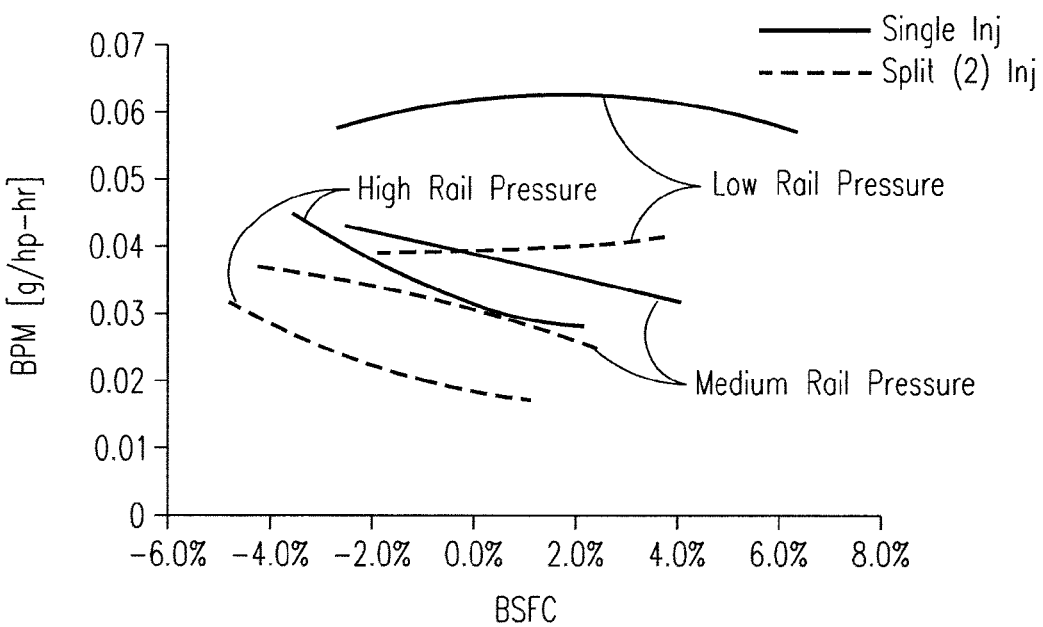
FIG. 4 is a graph having particulate matter emissions plotted versus fuel consumption for injections made at different injection pressures.

With respect to the graphs in FIGS. 3 and 4, there is demonstrated the efficacy of varying injection pressures and the number of injections on fuel consumption and emissions. The tests were conducted on a common rail fuel injection system that injected fuel into a single high-flow test cylinder. The engine was operating at an intermediate speed and load.

In FIG. 3, injections were made at three different pressures representing high, medium and low accumulator pressures. For each injection pressure a single injection and a split (two injections) injection were made. The brake specific fuel consumption (fuel flow rate divided by brake power) was measured and is plotted on the horizontal axis; and, the brake specific $NO_x$ emissions (mass flow rate of NOx divided by brake power) were measured and are plotted on the vertical axis. Each of the curves shown in FIG. 3 represents several data points which are injection events. All data points were normalized to an arbitrary baseline so that the fuel consumption is expressed as a percentage of that baseline. For example, for a single curve there were three data points which were averaged to determine the baseline from which the remaining data points were plotted. The same was done for preparation of the graph in FIG. 4

As shown in this graph, brake specific fuel consumption and brake specific $NO_x$ emissions improved for both single injections and split injections as the fuel accumulator pressure was decreased. In addition, for each of the different fuel pressures the split injections showed an improved consumption and $NO_x$ emissions over the single injections.

In FIG. 4, injections were made at three different pressures representing high, medium and low accumulator pressures. For each injection pressure a single injection and a split (two injections) injection were made. The brake specific fuel consumed (fuel flow rate divided by brake power) was measured and is plotted on the horizontal axis; and, the brake specific particulate matter emissions (mass flow rate of particulate matter divided by brake power) were measured and are plotted on the vertical axis. As shown in this graph, fuel consumption and particulate matter emissions improved for both single injections and split injections as the fuel accumulator pressure was increased. In addition, for each of the different fuel accumulator pressures the split injections showed an improved consumption and particulate matter emissions over the single injections.

As a vehicle may travel long distances at various altitudes, the air manifold pressure and in-cylinder gas density will change. These changing parameters may directly affect the efficiency of fuel consumption and emissions. While prior art fuel injection systems such as the unit pump systems considered air manifold pressure, such systems did not factor in the in-cylinder gas density. Moreover, such systems could control only the timing and duration of the injection, and were limited to a single injection during an engine cycle. In addition, fuel injection pressure could not be controlled independent of other parameters. In embodiments of the disclosed invention parameters in an injection strategy are controlled independent of one another; therefore, factoring in the in-cylinder gas density and the altitude at which an engine is operating may more effectively control fuel consumption and emissions in an internal combustion engine over a wide range of operating conditions While the preferred embodiments of the present invention have been shown and described herein, it will be obvious that such embodiments are provided by way of example only. Numerous variations, changes and substitutions will occur to those of skill in the art without departing from the invention herein. Therefore, it is intended that the invention not be limited to the particular disclosed as the best mode contemplated for carrying out this invention, but that the invention will include all embodiments falling within the scope of the appended claims.

What is claimed is:

1. A high-pressure fuel injection system for controlling the fuel injection event in an internal combustion engine mounted in a vehicle and having an engine block with one or more cylinders within which fuel is injected, the fuel injection system comprising:

a high-pressure fuel pump in fluid communication with a fuel reservoir;

a fuel accumulator, in fluid communication with the high-pressure fuel pump;

one or more injectors that are in fluid communication with the fuel accumulator and each of the fuel injectors are in fluid communication with a corresponding cylinder in which a piston is supported;

the one or more injectors having a valve that opens or closes responsive to electrical pulses;

a controller, in electrical communication with the one or more of the injectors and the high-pressure fuel pump that, during operation of the engine, generates one or more first signals responsive to which the valve in the injector opens or closes and one or more second signals responsive to which the high-pressure fuel pump increases or decreases the pressure level in the fuel accumulator;

one or more sensors for detecting operating parameters, during operation of the engine, comprising a temperature of air in an air manifold, a pressure within the air manifold and a barometric pressure, wherein the barometric pressure is an ambient atmospheric pressure external of the vehicle or fuel injection system;

wherein the one or more sensors send data, indicative of these operating parameters, to the controller; and, the controller is programmed to estimate an in-cylinder gas density during operation of the engine using data received from the sensors.

2. The system of claim 1 further comprising a database with which the controller communicates, having data representative of one or predetermined in-cylinder gas densities that are associated with one or more predetermined parameters relating to the injection of fuel into the cylinder during an engine cycle, and which fuel injection parameters are selected responsive to one or more commands generated from the controller.

3. The system of claim 2 wherein the controller receives data relative to the altitude at which the engine is operating, and the database has data representative one or more altitudes that are associated with one or more predetermined parameters relating to the injection of fuel into the cylinder during an engine cycle, and which fuel injection parameters are selected responsive to one or more commands generated from the controller.

4. The system of claim 2 wherein the one or more predetermined parameters relating to injection of fuel is the fuel accumulator pressure at which the fuel is injected.

5. The system of claim 2 wherein the one or more predetermined parameters relating to injection of fuel is the timing at which the fuel is injected during an engine cycle.

6. The system of claim 2 wherein the one or more predetermined parameters relating to injection of fuel is the number of fuel injections made during an engine cycle.

7. The system of claim 1 wherein the one or more predetermined parameters relating to injection of fuel is duration of a fuel injection made during an engine cycle.

8. A method for controlling a fuel injection event in an internal combustion engine mounted in a vehicle and having an engine block with one or more cylinders within which fuel is injected, the method comprising the steps of:

monitoring, from one or mores sensors, a temperature of air in an air manifold, a pressure within the air manifold and a barometric pressure;

transmitting, from the one or more sensors, one or more signals indicative of the temperature of the air in the air manifold, the pressure within the air manifold and the barometric pressure, wherein the barometric pressure is an ambient atmospheric pressure external of the vehicle or fuel injection system for sending data relative thereto to a fuel injection controlling controller;

estimating, at the fuel injection controller, an in-cylinder gas density of a cylinder using the data relative to the temperature of the air manifold, the pressure within the air manifold and the barometric pressure; and, transmitting, in response to the estimation of the in-cylinder gas density and from the controller, one or more commands relative to fuel injection in the cylinder.

9. The method of claim 8 further comprising the step of comparing the estimated in-cylinder gas density to one or more predetermined gas densities stored in a database of the controller wherein said predetermined gas densities are associated with one or more predetermined parameters for the injection of fuel, the step of selecting one or more predetermined parameters for the injection of fuel responsive to this comparison and the step of generating a command indicative of the selected parameters.

10. The method of claim 9 wherein the one or more predetermined parameters relating to injection of fuel is the fuel accumulator pressure at which the fuel is injected.

11. The method of claim 9 wherein the one or more predetermined parameters relating to injection of fuel is the timing at which the fuel is injected during an engine cycle.

12. The method of claim 9 wherein the one or more predetermined parameters relating to injection of fuel is the number of fuel injections made during an engine cycle.

13. The method of claim 9 wherein the one or more predetermined parameters relating to injection of fuel is the timing of fuel injections made during an engine cycle.

14. The method of claim 9 wherein the one or more predetermined parameters relating to injection of fuel is duration of a fuel injection made during an engine cycle.

15. The method of claim 8 further comprising the step of generating a signal sent to the control which signal is indicative of an altitude at which the engine is operating, the step of comparing the altitude to one or more predetermined altitudes stored in a database of the controller wherein said predetermined altitudes are associated with one or more predetermined parameters for the injection of fuel, the step of selecting one or more predetermined parameters for the injection of fuel responsive to this comparison and the step of generating a command includes generating a command indicative of the selected parameters.

16. The method of claim 8 wherein the step of estimating the in-cylinder gas density includes using a volume of the cylinder at a predetermined position of a crankshaft within the cylinder.

17. Computer readable media containing program instructions for controlling a fuel injection event in an internal combustion mounted in a vehicle and having an engine block with one or more cylinders within which fuel is injected, the computer media comprising:

a computer program for detecting, from one or mores sensors, a temperature of an air manifold, a pressure within the air manifold and a barometric pressure;

a computer program for generating, from the one or more sensors, one or more signals indicative of the temperature of the air manifold, the pressure within the air manifold and the barometric pressure, wherein the barometric pressure is an ambient atmospheric pressure external of the vehicle or fuel injection system for sending data relative thereof to a controller;

a computer program for estimating, at the controller, an in-cylinder gas density of a cylinder using the data relative to the temperature of the air manifold, the pressure within the air manifold and the barometric pressure; and, a computer program for generating, in response to the estimation of the in-cylinder gas density and from the controller, one or more commands relative to fuel injection in the cylinder.

18. The computer readable media of claim 17 further comprising one or more programs for comparing the estimated in-cylinder gas density to one or more predetermined gas densities stored in a database of the controller wherein said predetermined gas densities are associated with one or more predetermined parameters for the injection of fuel, and for selecting one or more predetermined parameters for the injection of fuel responsive to this comparison and generating a command includes generating a command indicative of the selected parameters.

19. The computer readable media of claim 18 further comprising one or more program instructions for of generating a signal sent to the controller which signal is indicative of an altitude at which the engine is operating, comparing the altitude to one or more predetermined altitudes stored in a database of the controller wherein said predetermined altitudes are associated with one or more predetermined parameters for the injection of fuel, selecting one or more predetermined parameters for the injection of fuel responsive to this comparison and generating a command includes generating a command indicative of the selected parameters.

* * * * *